United States Patent [19]

Berenato

[11] Patent Number: 5,400,395
[45] Date of Patent: Mar. 21, 1995

[54] TELEPHONE LINE SELECTOR AND CALL ACCOUNTANT

[75] Inventor: Daniel A. Berenato, Virginia Beach, Va.

[73] Assignee: The United States of America as represented by the Secretary of the Navy, Washington, D.C.

[21] Appl. No.: 43,069

[22] Filed: Apr. 5, 1993

[51] Int. Cl.6 .................. H04M 1/00; H04M 3/00; H04M 15/00
[52] U.S. Cl. .................. 379/114; 379/130; 379/112; 379/120; 379/157
[58] Field of Search .......... 379/112, 111, 114, 120, 379/130, 131, 132, 141, 145, 165, 143, 156, 157

[56] References Cited

U.S. PATENT DOCUMENTS

| | | | |
|---|---|---|---|
| 4,122,308 | 10/1978 | Weinberger et al. | 379/114 |
| 4,656,656 | 4/1987 | Mundy, Jr. et al. | 379/120 X |
| 4,751,728 | 6/1988 | Treat | 379/113 |
| 4,813,065 | 5/1989 | Segala | 379/112 |
| 4,837,813 | 6/1989 | Terajima | 379/140 X |
| 4,868,759 | 9/1989 | Kokubu | 364/464.01 |
| 4,964,159 | 10/1990 | Son | 379/356 |
| 4,972,464 | 11/1990 | Webb et al. | 397/112 |
| 5,113,433 | 5/1992 | Hird et al. | 379/130 |

Primary Examiner—Stephen Chin
Assistant Examiner—Paul Loomis
Attorney, Agent, or Firm—Jacob Shuster

[57] ABSTRACT

A telephone line selection and accounting system is provided. The system has an electronically programmable read only memory (EPROM) database of rate information for each carrier. Upon initiation of a user call, the database is first updated using automatic rate update tones (if available) from each carrier. The database rate information is then used to select the lowest cost carrier. The system provides the capability to connect to a carrier using either distinct lines or local access numbers over a common line. During the call, total elapsed time and cost is displayed at the user phone. Once the call is complete, call accounting information is stored for later retrieval and analysis. In addition to the automatic rate update tones, the rate information database may be updated either by changing EPROMs or by manually entering new rate information from a user phone.

16 Claims, 3 Drawing Sheets

TELEPHONE LINE SELECTOR AND CALL ACCOUNTANT

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to the telecommunications field. In particular, it is a device for telephone line selection and call accounting.

BACKGROUND OF THE INVENTION

Telephone metering devices have been available in the prior art for some years. These devices allowed the telephone user to gauge the amount of time elapsed during a phone call and by entering the cost of the call per minute, to compute and display the cost of the call. However, only recently have attempts been made to provide for a line selection device based on these costs.

One prior art reference (U.S. Pat. No. 4,751,728) discloses a computer driven line selection device which also provides call metering capabilities. This patent however, relies on the telephone user to provide call rate information. Because this system is dependent upon manual input, cost information must be continuously updated to prevent inappropriate line selection. Additionally, this patent provides for a device which only handles one user telephone and one outgoing telephone line.

SUMMARY OF THE INVENTION

Accordingly, it is an object of the present invention to provide a telephone line selection and accounting system having capabilities for selecting the lowest priced long distance carrier, establishing a long distance connection using the selected carrier, and displaying elapsed time and cost metrics during the phone call.

A still further object of the present invention is to provide a database of rate information based on carrier, area code, and time of day which can be updated automatically by the system users.

It is a further object of the present invention to provide the capability of storing call accounting information so that this information can be retrieved periodically and analyzed to further reduce long distance expenses.

In accordance with the present invention, a complete telephone line selection and call accounting system is provided. The system utilizes an electronically programmable read only memory (EPROM) database to store rate information for each available carrier. This rate information is used to select the lowest cost carrier for each call. During the call, the elapsed time and cost of the call are displayed at the originator's telephone. Upon call completion, statistical information about the call including the cost and duration are stored in nonvolatile memory for later billing analysis.

Additionally, the rate database can be updated either manually by the user or automatically through interpretation of billing tones during normal system use.

The complete system is designed to work with one or more end users and one or more long distance carriers. The carriers may be connected to the system through either high capacity telephone trunks or normal residential style single lines.

BRIEF DESCRIPTION OF THE DRAWINGS

Other objects and advantages of the present invention will become more obvious hereinafter in the specification and drawings, wherein.

DETAILED DESCRIPTION OF THE INVENTION

Figure 1:
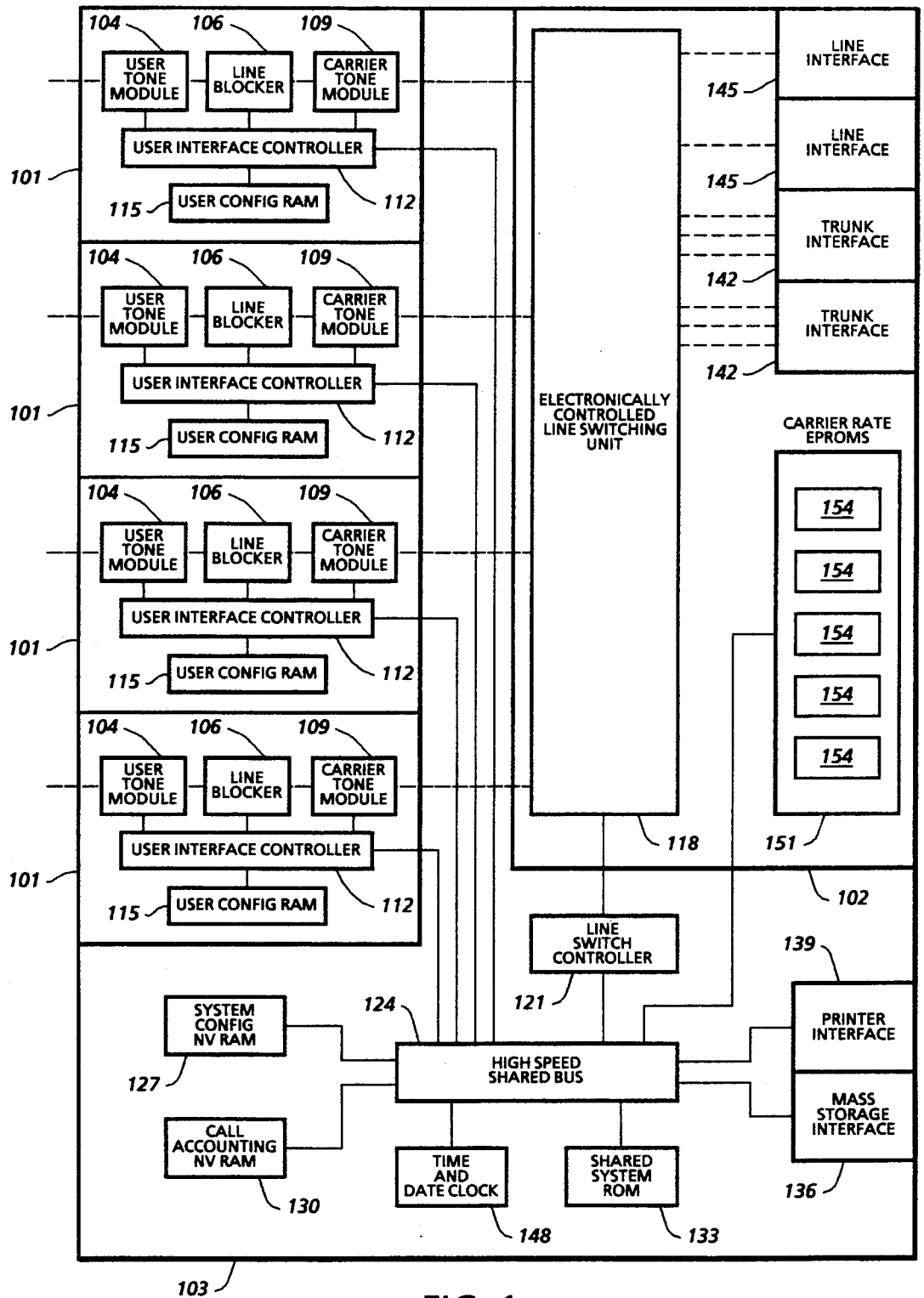
FIG. 1 is a block diagram of the multi-phone, multi-line embodiment of the present invention.

Referring now to the drawings, and in particular to FIG. 1, a block level diagram of the preferred embodiment of the present invention is shown. The complete system is comprised of three major components: one or more end user phone controller modules 101, a matrix switch and carrier connectivity module 102, and a computational support module 103.

System operation is initiated when the end user lifts the handset of a telephone connected to the system. User tone module 104 detects the telephone set off-the-hook and notifies user interface controller 112. User interface controller 112 signals user tone module 104 to provide a dial tone. The system remains idle until the user terminates the call by placing the telephone handset back on-the-hook or begins dialing a telephone number.

If the call is terminated, user tone module 104 detects that the telephone handset is back on-the-hook and notifies user interface controller 112. User interface controller 112 signals user tone module 104 by turning off dial tone generation. System operation is then suspended until the handset is again off-the-hook.

If the user begins dialing telephone digits, user tone module 104 first turns off dial tone generation and then translates the dialed telephone tones into numeric digits which are passed to user interface controller 112. If the call is terminated at any time before a full set of digits is collected by the user interface controller 112, user tone module 104 detects handset on-the-hook and returns the system to idle state.

Once user interface controller 112 has collected a complete set of digits, it reads system configuration memory 127 across system bus 124. If the system has been configured for automatic rate update, each carrier available is read from configuration memory 127 and a carrier connect request is passed through system bus 124 to line switch controller 121. Line switch controller 121 selects the appropriate line interface 145 or trunk interface 142 and connects that carrier's line through electronically controlled line switching unit 118 to carrier tone module 109. Line switch controller 121 then notifies user interface controller 112 that the carrier connect request has been completed.

User interface controller 112 reads user configuration memory 115 for specific dialing instructions for the selected carrier. If specific dialing instructions exist in user configuration memory 115, user interface controller 112 uses these instructions to modify its dialing sequence to handle local access numbers or security codes. If no specific dialing instructions exist in user configuration memory 115, user interface controller 112 dials the same sequence of numbers originally dialed by the end user. In either case, the digits to be dialed are passed to carrier tone module 109 which translates them into telephone tones.

Once the number is dialed, carrier tone module 109 waits for automatic rate update tones during the first seconds of the call, before the call is connected. Once these tones are received, carrier tone module 109 decodes them and passes the new rate information to the user interface controller 112. User interface controller reads the time of day from time and date clock 148 and uses the area code dialed, time of day, and carrier to update the appropriate carrier rate EPROM 154 in the carrier rate database 151.

Once the automatic update tones have been received or if no update tones are received during the first few seconds of the call, user interface controller 112 signals line switch controller 121 to disconnect the call. User interface controller 112 will then select the next available carrier and repeat the process again.

After all carriers have been selected and their rates have been updated in carrier rate database 151, (or if the system has not been configured for automatic rate update) user interface controller 112 reads the current time from time and date clock 148. Using this information and the area code to be called, user interface controller 112 reads the rate information for each carrier from carrier rate database 151. User interface controller selects the lowest cost carrier and sends a carrier connect message to line switch controller 121 for that carrier. Once user interface controller 112 receives the carrier connect request completed message from line switch controller 121, it resets an internal call timer to zero and then signals line blocker 106 to unblock the line, thus connecting the end user call through user tone module 104, line blocker 106, carrier tone module 109, electronically controlled line switching unit 118, and either single line interface 145 or trunk interface 142 to the called destination.

During the call, user interface controller 112 reads the elapsed time of the call from its internal timer and then multiplies this by the rate information from carrier rate database 151 to find the current total cost of the call. This time and cost information is relayed back through user tone module 104 to the telephone user.

When user tone module 104 detects handset on-the-hook, it signals user interface controller 112 that the call has been completed. User interface controller 112 stops its internal time, and signals line switch controller 121 to disconnect the call. User interface controller 112 also writes a call accounting record, containing the call statistics including which user interface controller and which carrier was used. Also included is the carrier's rate at the time of the call, the total time of the call, and the total cost of the call. This accounting data is stored in non-volatile memory 130.

The data in call to call accounting non-volatile memory 130, as well as system configuration memory 127, and user configuration memory 115 can be viewed from the user telephone using special sequences. The user may also move the contents of these memories to and from mass storage devices connected to mass storage interface 136 or print the contents of these memories using a printer connected to printer interface 139.

System operating code is stored in a shared system read only memory 133, and is read during system execution by each user interface controller 112.

Figure 2:
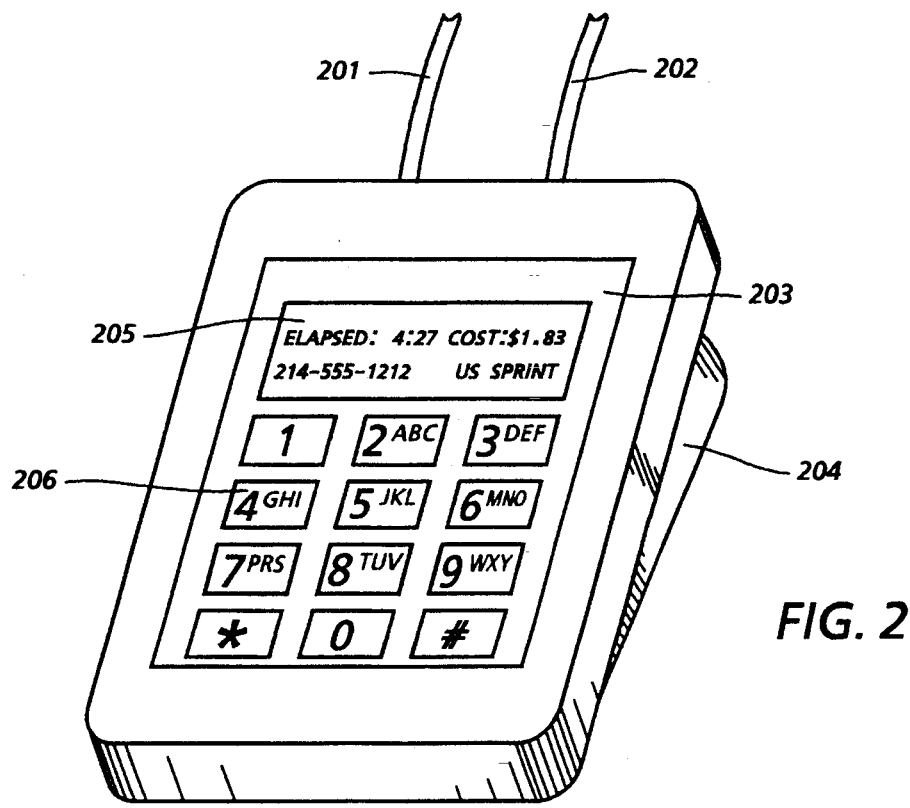
FIG. 2 is an external perspective view of the non-integrated, stand alone embodiment of the present invention.

Referring now to FIG. 2, an external, perspective view of the stand alone embodiment of the present invention is shown. The system is housed within housing 204. One or more lines 201 are connected to end user telephone systems and one or more lines 202 are connected to long distance carriers. A panel 203 contains multi-line display 205 and numeric keypad 206. Multi-line display 205 is used to display data to the user including the cost and elapsed time of a call in progress. Numeric keypad 206 can be used either for dialing or for remote configuration of the system. This embodiment is suitable either for centralized mounting for connecting to several telephones or desktop mounting when used with a single telephone.

Figure 3:
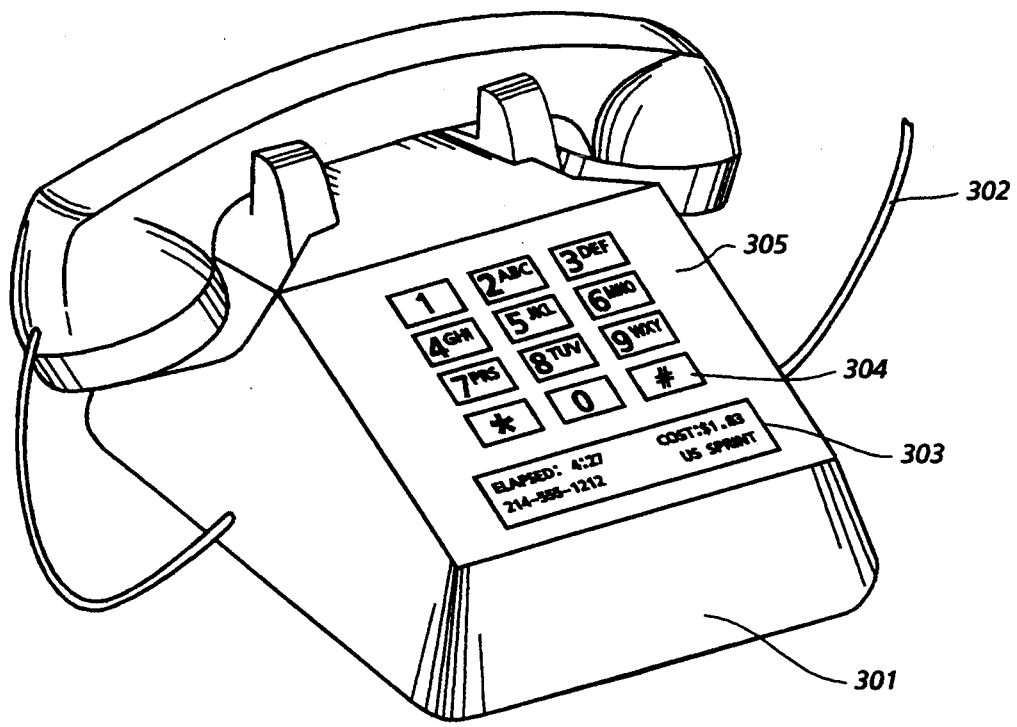
FIG. 3 is an external perspective view of integrated telephone embodiment of the present invention.

Referring now to FIG. 3, a perspective view of the internal, integrated phone and system unit embodiment of the present invention is shown. The complete system is housed within standard telephone housing 301. The connection between the phone and the system is internal; however, one or more lines 302 to long distance carriers are connected to the telephone. The telephone has a standard faceplate 305 with an integrated numeric keypad 304 and multi-line display 303. Multi-line display 303 is used to display data to the user including the cost and elapsed time of a call in progress. Numeric keypad 304 can be used either for dialing or for configuration of the system. This embodiment is suitable only for a single connected telephone, although several lines from long distance carriers may be connected to the system.

Figure 4:
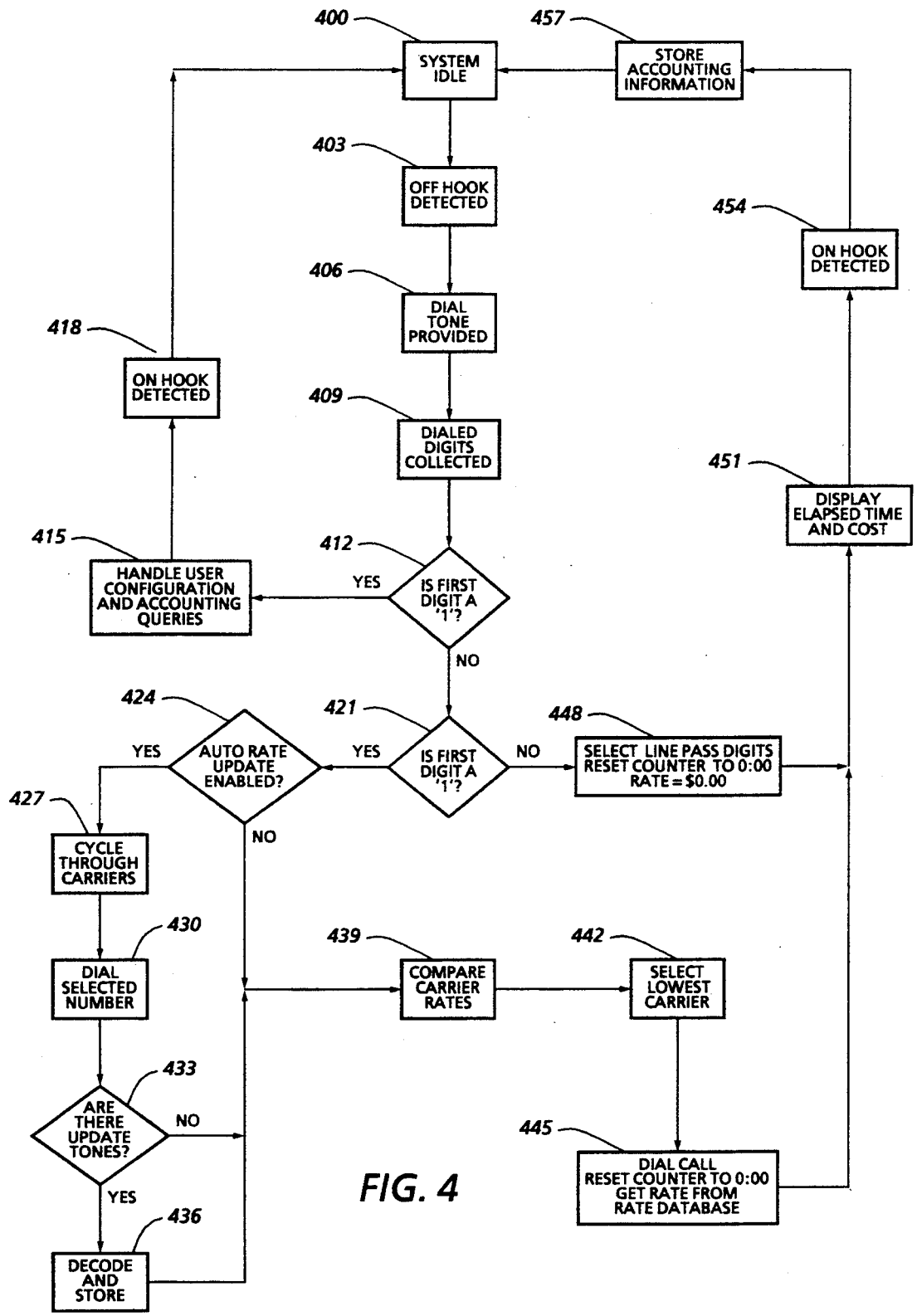
FIG. 4 is a flowchart showing the operation of the present invention.

Referring now to FIG. 4, a flowchart of the operations performed by the user interface controller is shown. The instructions represented by this flowchart are stored in the system shared read only memory for use by all interface controllers. The user interface controller starts in system idle state 400. When an off-the-hook condition is detected in state 403, the system moves through state 406 providing a dial tone and moves onto the digit collection state 409.

If the first digit checked in state 412 is a (*) (indicating user configuration commands), the system accepts user configuration and call accounting queries in state 415 until the phone is placed back on-the-hook in state 418. This moves the system back to the idle state 400.

If the first digit is not a (*), the system checks in state 421 for a '1' indicating a long distance call. If a 1 is not found the call is local. In state 448, a local line is selected, the call timer is reset to zero, and the call rate is set to $0.00 per minute. During the call, the system stays in state 451, displaying the elapsed time and cost of the call. When the phone is hung up, the on-the-hook is detected in state 454, and final accounting information for that call is stored in state 457. Once the accounting information has been stored, the system returns to the idle state 400.

If the first digit is a '1' indicating a long distance call, the system moves from state 421 to state 424 wherein the configuration is checked to see if automatic rate updating has been selected. If automatic rate update has been selected, the system transitions to state 427 and begins cycling through the available carriers. For each carrier, the system enters state 430 and dials the selected number. If update tones are detected in state 433, then they are decoded and the new rate is stored in state 436.

Once all carriers have been checked or if automatic rate update has not been configured, the system moves the state 439 and all available carriers are compared to find the lowest rate. The lowest rate is used to select the carrier in state 442 and the call is made, call timer is reset to 0:00, and rate information is stored from the rate database in state 445. During the call, the system stays in state 451, displaying the elapsed time and cost of the call. When the phone is hung up, the on-the-hook is detected in state 454, and final accounting information for that call is stored in state 457. Once the accounting information has been stored, the system returns to the idle state 400.

The features and benefits of the invention are numerous. The automatic selection of phone routing is provided based on time of day and stored carrier tariff data. Automatic and manual update of the stored tariff data is provided along with real time accounting for individual calls and stored data for later cost analysis.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A telephone line selection and accounting system, comprising:
   a. a protective housing;
   b. a user phone controller module located within said protective housing for connecting to an end user telephone comprising a user interface controller connected in parallel to a user tone module, a line blocker, and a carrier tone module;
   c. means for automatically collecting and storing telephone rate information database attached to said protective housing and controlled by said user telephone controller module;
   d. means for updating said rate information database attached to said means for storing;
   e. a line switch controller connected to and controlled by said user phone controller module;
   f. an electronically controlled line switching unit attached to and controlled by said line switch controller;
   g. means for connecting to carrier central offices attached to the electronically controlled line switching unit;
   h. a high speed shared bus connecting said user phone controller module with said means for storing, and said line switch controller:
   i. means for displaying elapsed time and cost information during a call affixed to said protective housing and electrically connected to said user phone controller module;
   j. means for accumulating call accounting information connected to said high speed shared bus; and
   k. means for analyzing the call accounting information connected to said high speed shared bus.

2. A telephone line selection and accounting system as in claim 1 wherein said protective housing is a standard telephone unit.

3. A telephone line selection and accounting system as in claim 1 wherein said user phone controller module comprises a circuit card having a central processor unit attached thereto, said central processor electrically connected to and controlling a user configurable random access memory module, a user tone module, a line blocker, and a carrier tone module.

4. A telephone line selection and accounting system as in claim 1 wherein said means for storing further comprises a plurality of electronically programmable memory modules having rate information by carrier, geographical location, and time of day.

5. A telephone line selection and accounting system as in claim 1 wherein said means for updating includes means for decoding telephone tones and automatically updating the rate information in said means for storing.

6. A telephone line selection and accounting system as in claim 1 wherein said means for updating includes means for accepting operator input and manually updating the rate information in said database storing means.

7. A telephone line selection and accounting system as in claim 1 wherein said means for connecting comprises a trunk interface.

8. A telephone line selection and accounting system as in claim 1 wherein said means for connecting comprises a line interface.

9. A telephone line selection and accounting system as in claim 1 wherein said means for displaying further comprises a single line alpha-numeric digital display affixed to said housing.

10. A telephone line selection and accounting system as in claim 1 wherein said means for accumulating comprises non-volatile random access memory.

11. A telephone line selection and accounting system as in claim 1 wherein said means for analyzing comprises software having the capability of sorting calls by common call characteristics.

12. A telephone line selection and accounting system as in claim 1 wherein said means for analyzing further comprises software having the capability of graphing call usage patterns.

13. A telephone line selection and accounting system as in claim 1 wherein said means for analyzing further comprises a printer interface.

14. A telephone line selection and accounting system as in claim 1 wherein said means for analyzing further comprises software having the capability of printing call records directly to a device attached to said printer interface.

15. A telephone line selection and accounting system as in claim 1 wherein said means for analyzing further comprises a mass storage device interface.

16. A telephone line selection and accounting system as in claim 15 wherein said means for analyzing further comprises software having the capability of storing and retrieving call records from a device attached to said mass storage device interface.

* * * * *